United States Patent
Sanchez (10) Patent No.: US 9,102,501 B2
(45) Date of Patent: Aug. 11, 2015

(54) ARBOR MOUNTED DISC ADJUSTING APPARATUS

(76) Inventor: Jesus Sanchez, Aurora, IL (US)

( * ) Notice: Subject to any disclaimer, the term of this patent is extended or adjusted under 35 U.S.C. 154(b) by 572 days.

(21) Appl. No.: 13/506,969

(22) Filed: May 29, 2012

(65) Prior Publication Data

US 2012/0240741 A1    Sep. 27, 2012

Related U.S. Application Data (63) Continuation-in-part of application No. 12/644,715, filed on Dec. 22, 2009, now Pat. No. 8,490,912.

(51) Int. Cl.
 *B65H 75/24* (2006.01)
 *B23D 35/00* (2006.01)
 *B26D 1/24* (2006.01)
 *B26D 7/26* (2006.01)

(52) U.S. Cl.
 CPC .......... *B65H 75/242* (2013.01); *B23D 35/007* (2013.01); *B26D 1/245* (2013.01); *B26D 7/2635* (2013.01); *B65H 75/24* (2013.01)

(58) Field of Classification Search
 CPC ........ B65H 75/24; B65H 75/02; B65H 75/18; B65H 75/185; B65H 75/22; B65H 75/242; B65H 75/247; B26D 7/26; B26D 7/265
 USPC ......... 83/13, 870, 56, 508.2, 508.3, 498, 499, 83/504; 242/570, 571, 571.5, 572, 573, 242/573.1–573.3
 See application file for complete search history.

(56) References Cited

U.S. PATENT DOCUMENTS

| | | | | |
|---|---|---|---|---|
| 2,315,729 | A * | 4/1943 | Nunnally | 101/375 |
| 2,696,354 | A * | 12/1954 | Novick | 242/578.1 |
| 2,942,892 | A * | 6/1960 | Nelson | 242/573 |
| 3,104,849 | A * | 9/1963 | Bond | 242/573.2 |
| 3,552,673 | A * | 1/1971 | Evers | 242/571.3 |
| 3,990,690 | A * | 11/1976 | Lick | 269/48.1 |
| 4,469,288 | A * | 9/1984 | Pontes | 242/576 |
| 2006/0090847 | A1 * | 5/2006 | Peirce | 156/344 |

* cited by examiner

*Primary Examiner* — Phong Nguyen
(74) *Attorney, Agent, or Firm* — Mathew R. P. Perrone, Jr.

(57) ABSTRACT

A shimless separator arbor for slitting a sheet of metal passing through a slitter has a separator adjustment device as a new separator adjustment device for allowing adjustments to the space between separators for the purpose of properly spacing strips of material formed from the sheet of metal to cut at two strips from the sheet, so the at least strips have a smooth edge.

9 Claims, 11 Drawing Sheets

ARBOR MOUNTED DISC ADJUSTING APPARATUS

CROSS REFERENCE TO RELATED APPLICATIONS

This application is a continuation in part of U.S. Pat. No. 8,490,929 which issued based on U.S. patent application Ser. No. 12/644,715, filed Dec. 22, 2009; which has also been filed with the Patent Cooperation Treaty bearing an International Application No. PCT/US2010/003182 and having an International filing date of Dec. 16, 2010, filed by the same inventive entity, and incorporated herein by reference.

This invention relates to a shimless separator arbor and more particularly to a shimless separator arbor for slitting a sheet of metal to have resulting quality edges on the thus formed metal strips, including a separator adjustment device as a new separator adjustment device for allowing adjustments to the space between separators for the purpose of properly spacing strips of material formed from the sheet of metal.

BACKGROUND OF THE INVENTION

Slitting a sheet of metal into narrower sheets or strips of metal requires great care to achieve the desired smooth edge or quality edge for the strips. Such slitting of sheets, and more particularly sheets of steel, is an art. If the cut of the sheet into narrower sheets can be accomplished efficiently and neatly, the edges of narrower sheets will be smooth and the production of the sheets can be much more efficient and produce better quality edges.

Without quality edges for the strips of material cut from the sheet, waste product is increased. Also, the safety of the workers is compromised when making corrections. This shimless separator arbor allows corrections without removing the material from the machine or stopping the machine, thus making a more efficient process. So quality edges add both to worker safety and waste minimization. The subject of this invention greatly reduces the amount of waste as compared to the prior art.

Yet cutting a sheet at the edge thereof requires substantial skill to obtain that smooth edge for the strips. As the edge is more efficiently formed and the sheets produced more efficiently, great advantages are obtained.

SUMMARY OF THE INVENTION

Among the many objectives of the present invention is the provision of a shimless separator arbor.

Another objective of the present invention is the provision of a shimless separator arbor, which provides for sheets with a smooth edge, cut from a wide sheet.

Also, an objective of the present invention is the provision of a shimless separator arbor, which is easily adjusted to cut sheets to a desired width.

Moreover, an objective of the present invention is the provision of a shimless separator arbor, which is durable.

A further objective of the present invention is the provision of a shimless separator arbor to produce quality edges.

A still further objective of the present invention is the provision of a shimless separator arbor to improve worker safety.

These and other objectives of the invention (which other objectives become clear by consideration of the specification, claims and drawings as a whole) are met by providing a shimless separator arbor to cut sheets with a smooth edge.

BRIEF DESCRIPTION OF THE DRAWINGS

The disclosure will be better understood and objects other than those set forth above will become apparent when consideration is given to the following detailed description thereof. Such description makes reference to the annexed drawings wherein.

Throughout the figures of the drawings, where the same part appears in more than one figure of the drawings, the same number is applied thereto.

DESCRIPTION OF THE PREFERRED EMBODIMENTS

An embodiment of the disclosure meets the needs presented above by generally providing a shimless separator arbor having a shaft or a tube with a first section and a second section. Each section has a first end, a second end and a perimeter wall extending between the first and second ends. The perimeter wall has a pair of elongated breaks therein extending through the first and second ends to partition the tube into the first section and the second section.

A coupler retains the first and second sections together in a tubular configuration. An actuation assembly is mechanically coupled to the first and second sections to selectively move the first and second sections toward or away from each other, such as by a slotted plate with a bolt through each slot. A plurality of separator discs is mounted on the tube so that the tube extends through the discs. The discs are movable on the tube when the first and second sections abut each other and are retained in place by friction between the discs and the tube when the first and second sections are moved apart from each other.

Thus if the sheet is slit into strips, such action is accomplished very efficiently with a shimless separator arbor, which can also be called an arbor mounted disc adjusting apparatus. Such efficiency by the shimless separator arbor of this invention produces the desired strips with a smooth edge, with much less waste.

In the prior art, the set up of the slitter required between 20 minutes to an hour. The subject of this invention greatly reduces the set up time as it takes a minute per arbor to set up the slitter system.

Moreover, in the prior art, if a correction needed to be made while the slitter machine was in operation, the slitter machine had to be stopped. Due to the weight of the material on the slitter machine, two people had to lift the material off the slitter machine to make the correction. Then, once the correction was made, two people had to return the material to the slitter machine. This was a time consuming process that required the help of two technicians.

In the subject of this invention, if a correction needs to be made, locking knobs 132 and 232 can handle the correction. The slitter machine must be slowed down to make the correction but it does not have to be stopped. Thus, the slitter machine is still operational but at a slower pace, which is a great improvement over the prior art. Also, because the material does not have to be lifted off the slitter machine, it only takes one person to make the correction. Thus, the subject of this invention greatly simplifies the correction process.

There is outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

Figure 1:
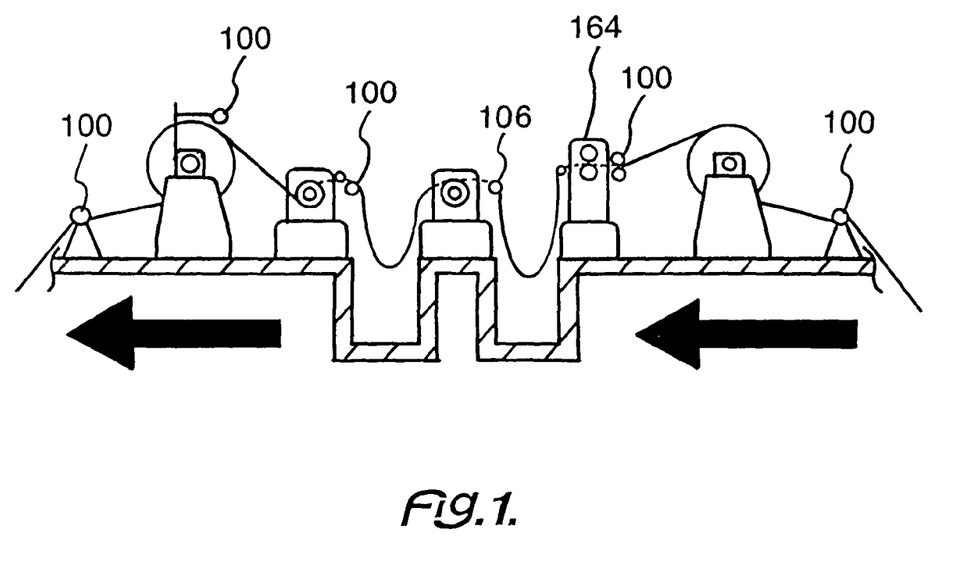
FIG. 1 depicts a side view of slitter machine 120 with a shimless separator arbor 100.
Figure 2:
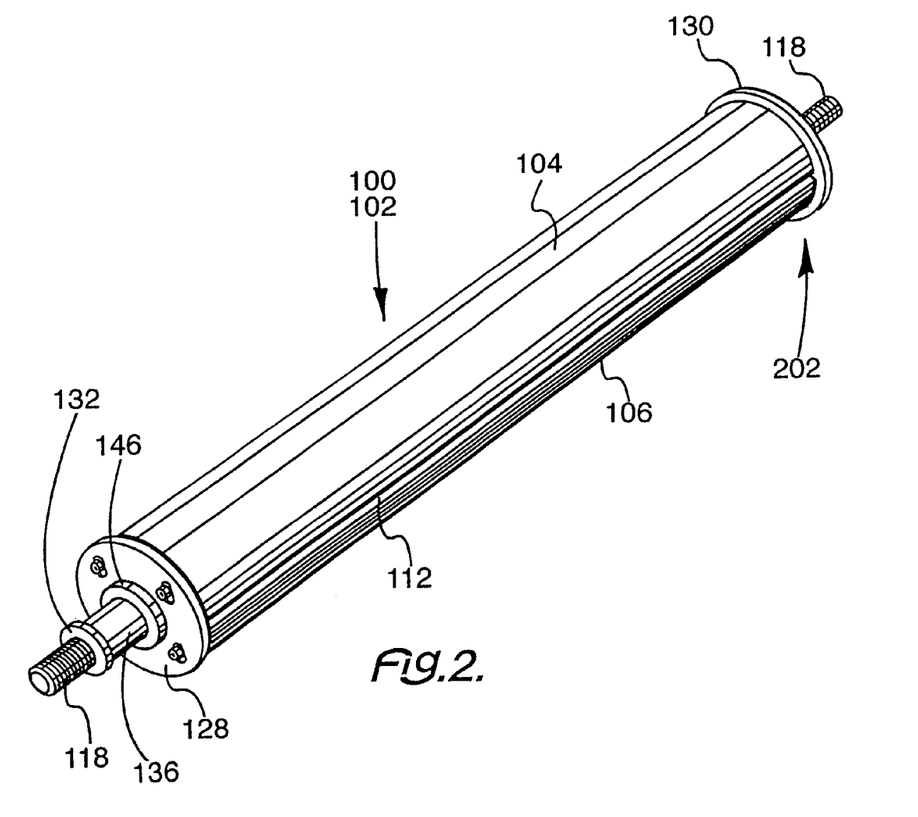
FIG. 2 depicts a perspective view of a shimless separator arbor 100 of this invention.

Referring now to FIG. 1 and FIG. 2, the structure of shimless separator arbor 100 can be clearly seen. Shimless separator arbor 100 can be installed at multiple points throughout slitter machine 120 (which is shown in a full side view in FIG. 1). Shimless separator arbor 100 includes a separator adjustment 102. Shimless separator arbor 100 further includes a first section 104 and a second section 106 which are separated by elongated break 112.

The slitter machine 120 is positioned such that inboard side 200 is used for adjustment and setup of shimless separator arbor 100. Inboard side 200 can be accessed while the slitter machine 120 is in operation. An operator stands on outboard side 202 which allows for fine tuning while the slitter machine 120 is in operation.

Figure 3:
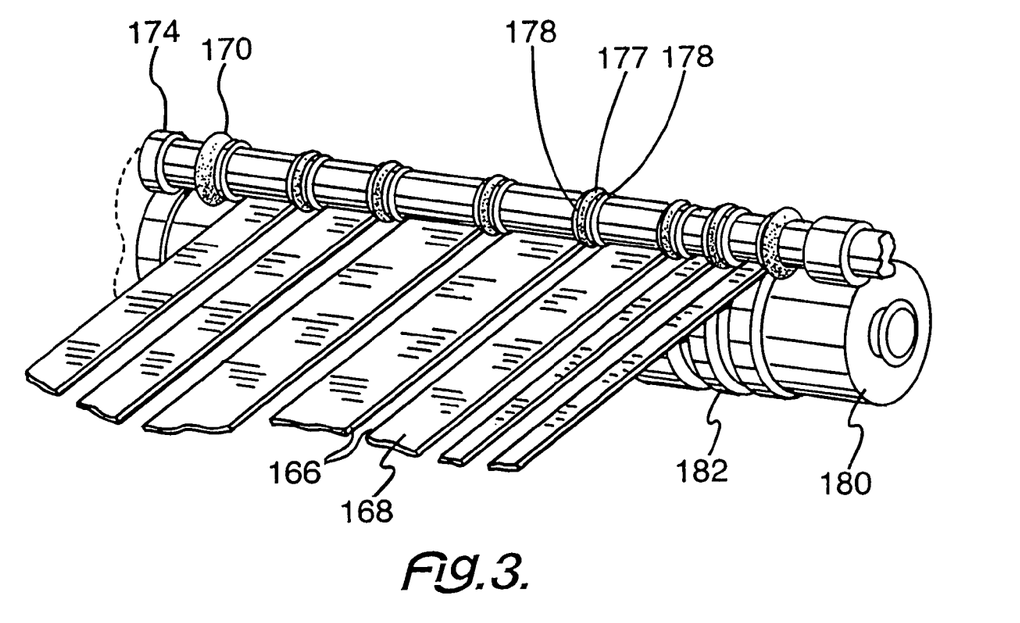
FIG. 3 depicts a perspective view of an shimless separator arbor 100 above the strips 168 of steel 166.
Figure 4:
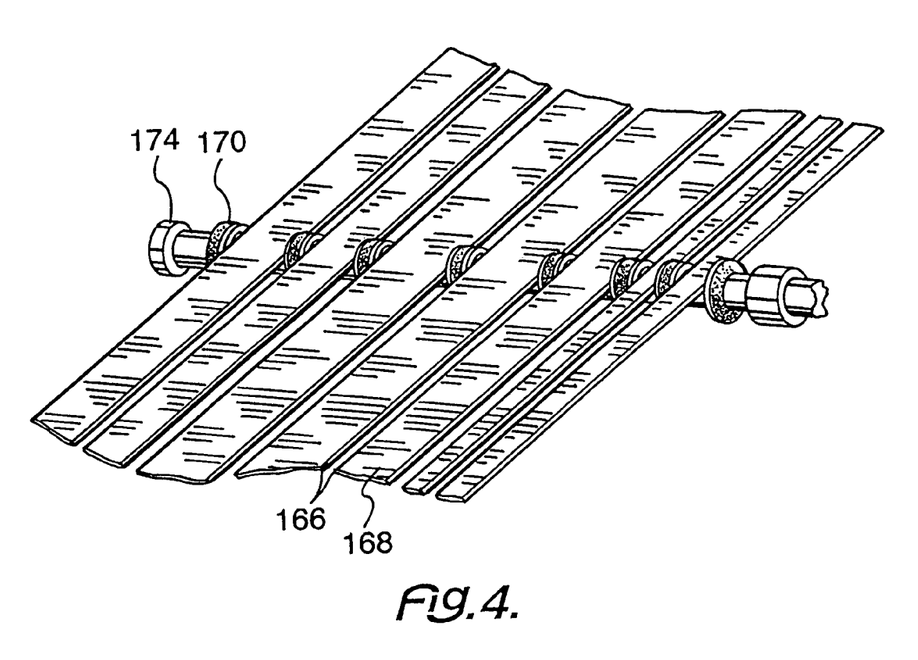
FIG. 4 depicts a perspective view of a shimless separator arbor 100 below the strips 168 of steel 166.

Adding FIG. 3 and FIG. 4 to the consideration, the flexibility of shimless separator arbor 100 can be clearly seen. The strips 168 formed from the steel 166 can be adjusted and handled while positioned beneath (FIG. 3) or above (FIG. 4) the shimless separator arbor 100. More particularly slitter 164 forms divided section 166 in order to make strips 168. O-ring 170 or 177 supports strips 168 as movement is accomplished by drive wheel 174. Cushion ring or O ring 170 also supports the sheet 114 and separator disc 178, as sheet 114 is cut into strips 168.

Drum 180 includes multiple supports 182 as coil strips 168 are formed. Multiple supports 182 on drum 180 support the strips 168 as the divided section 166 is cut therefrom.

Figure 5:
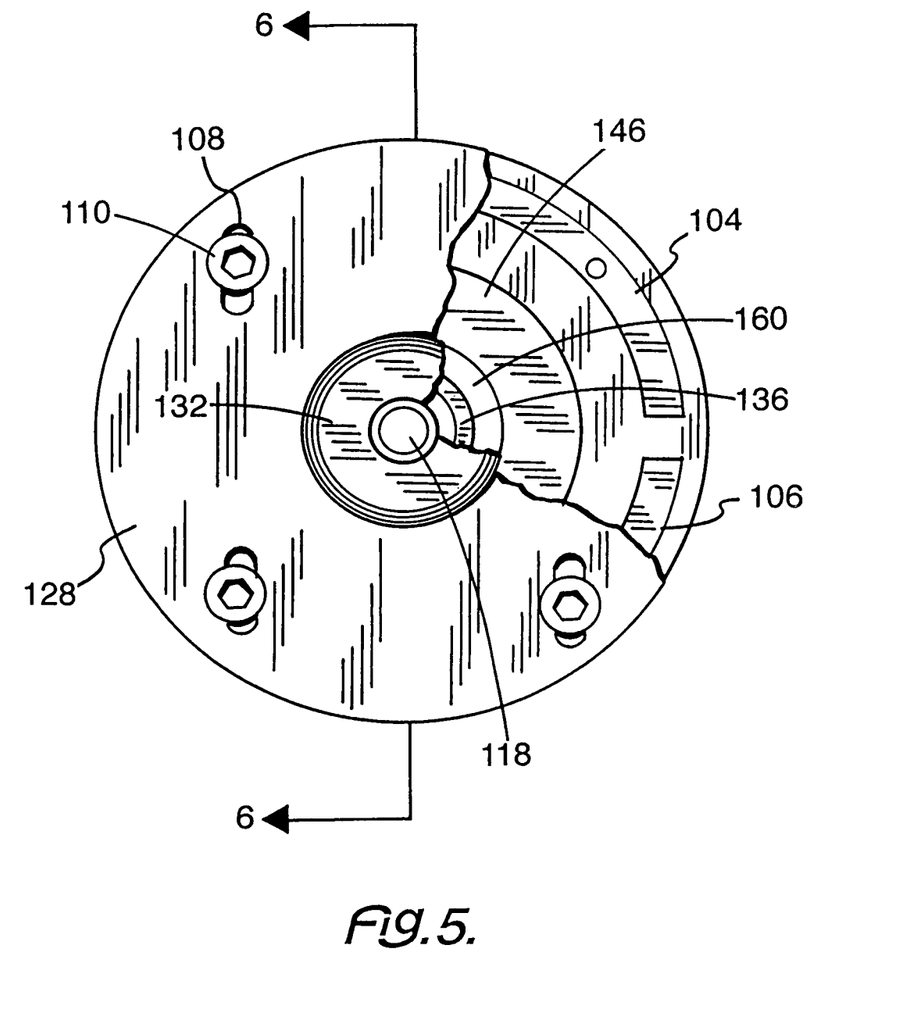
FIG. 5 depicts a profile end view of inboard side 200 of a shimless separator arbor.
Figure 6:
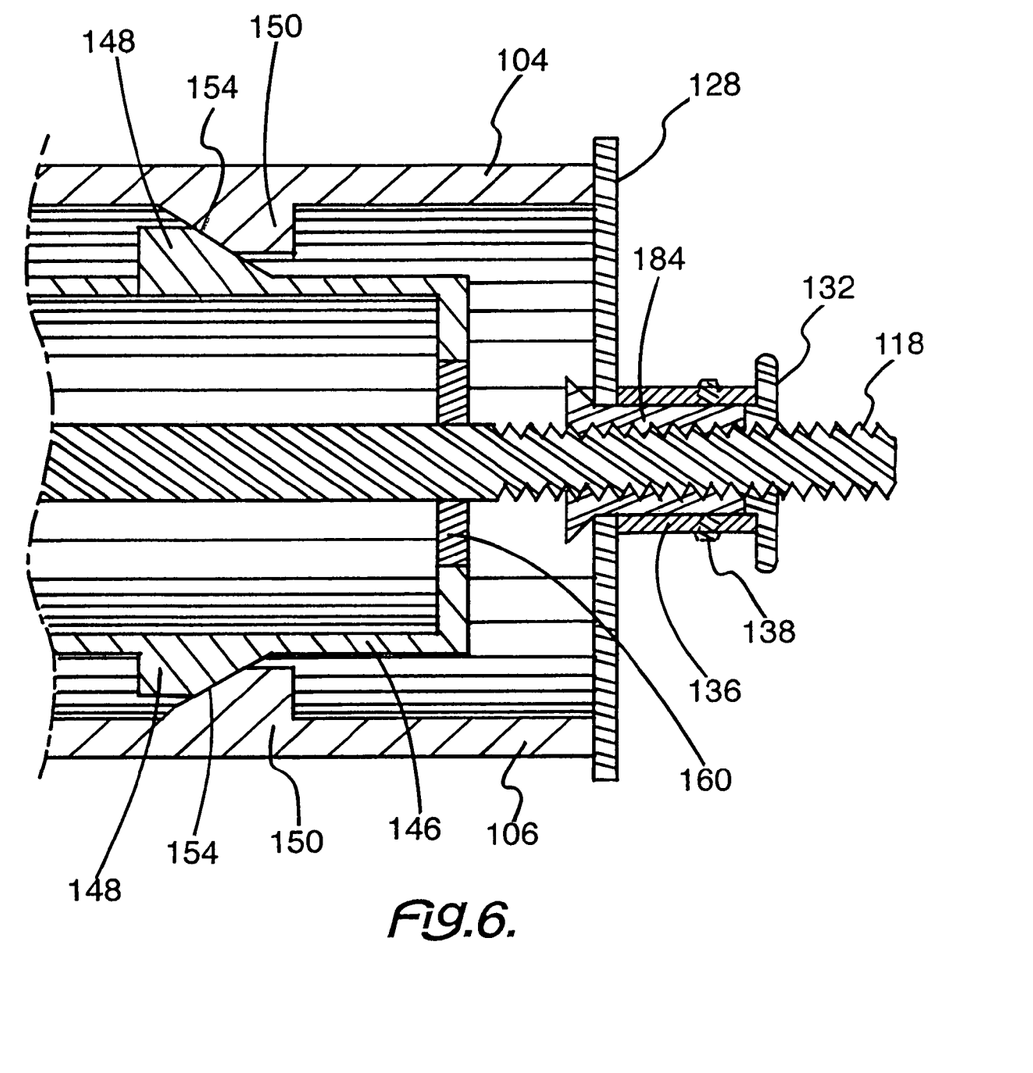
FIG. 6 depicts a cross section view of inboard side 200 showing second bearing 160 and third bearing 184 of a shimless separator arbor 100.

With the further discussion of FIG. 5 and FIG. 6, first section 104 and second section 106 of shimless separator arbor 100 have the inboard side 200 adjusted. While adjustment is preferably from the outboard side or operator side 202, the inboard side 200 may also provide an adjustment mechanism. Inboard side 200 has a plurality of separator lock bolt slots 108 releasably secured by separator lock bolt 110. Elongated break 112 is positioned between first section 104 and second section 106. Shaft 118 has first plate 128 held thereon with locking knob 132 and stop bushing 136 acting as a coupler. Stop set screw 138 secures and positions stop bushing 136 as desired.

Inner tube 146 includes a tube wedge 148. Outer surface of first section 104 and second section 106 supports inner tube 146 having tube wedge 148 thereon, with section wedge 150 on first section 104 and second section 106 in a diametrically opposed fashion. More particularly, first wedge taper 154 of first section wedge 150 has the contact with first tube wedge 148.

First bearing 160 supports shaft 118 at an unthreaded portion thereof at the end of inner tube 146. Second bearing 184 is positioned at first plate 128 in general and locking knob 132 in particular.

Figure 7:
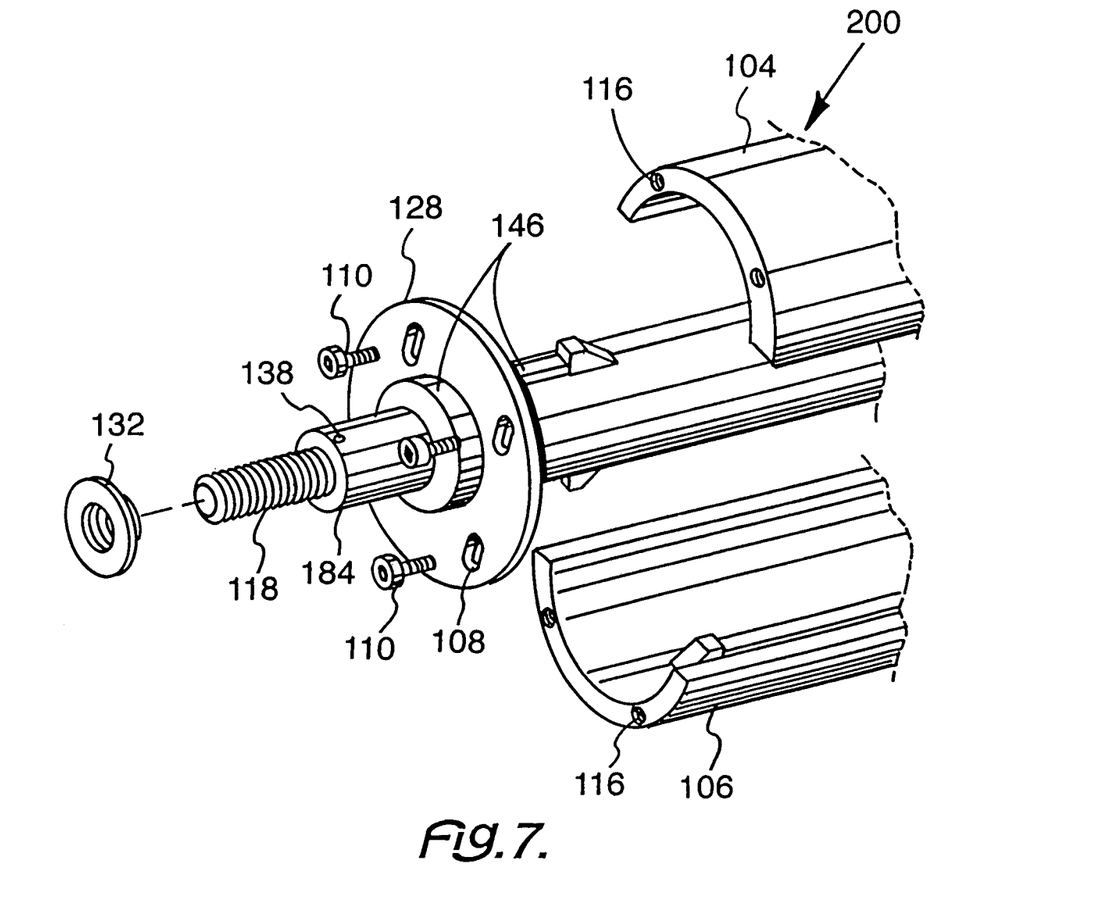
FIG. 7 depicts a perspective view of inboard side 200 of a shimless separator arbor 100 of this invention.

Adding FIG. 7 to the consideration, the structure becomes even more clear. Inboard side 200 of the shimless separator arbor 100 shows first section 104 with second section 106. Each of separator lock bolt slots 108 receives a separator lock bolt 110 at a threaded aperture 116 in first section 104 with second section 106. Lock bolt slots 108 are generally four in number. Shaft 118 at first plate 128 has locking knob 132 over threads 140 of shaft 118 in contact with wedge plug 184. Stop set screw 138 locks wedge plug 184 in place.

Figure 8:
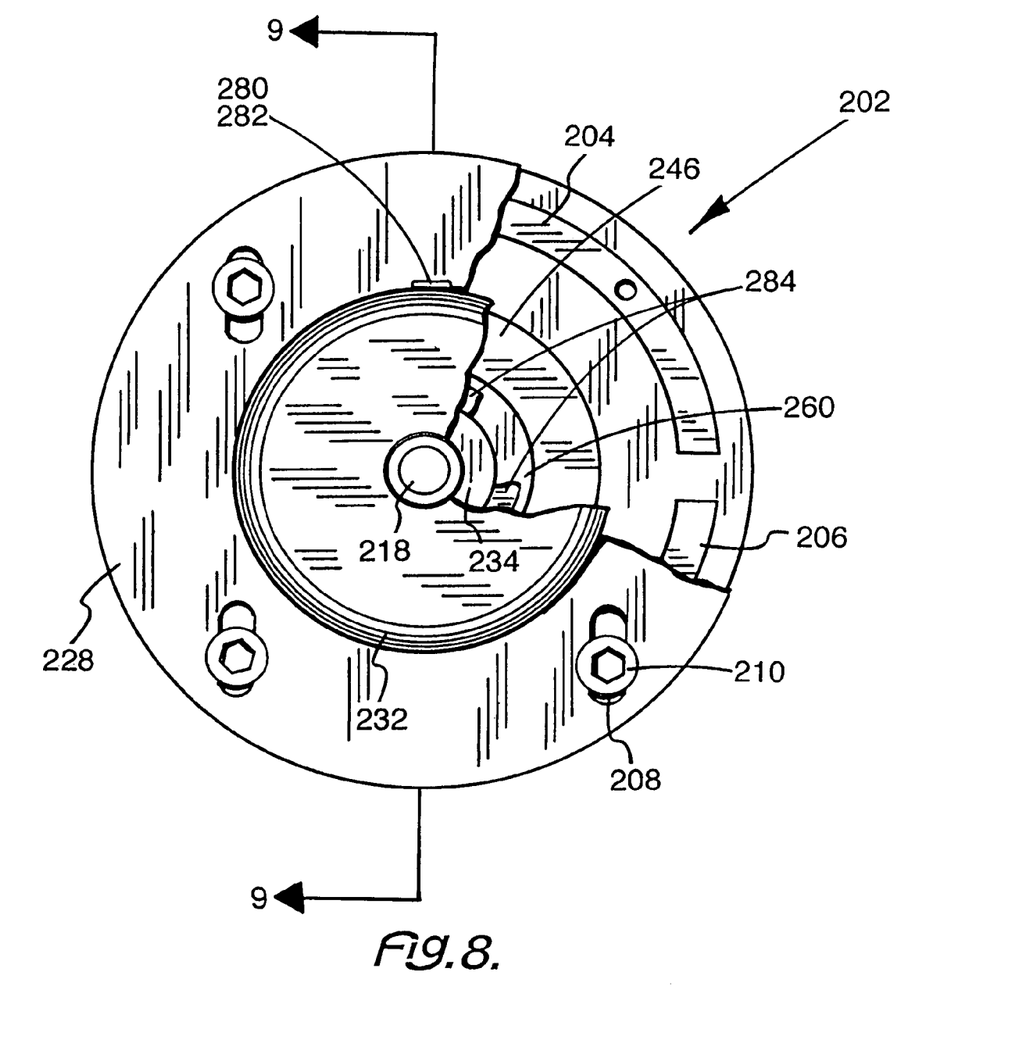
FIG. 8 depicts a profile end view of outboard side 202 a shimless separator arbor.
Figure 9:
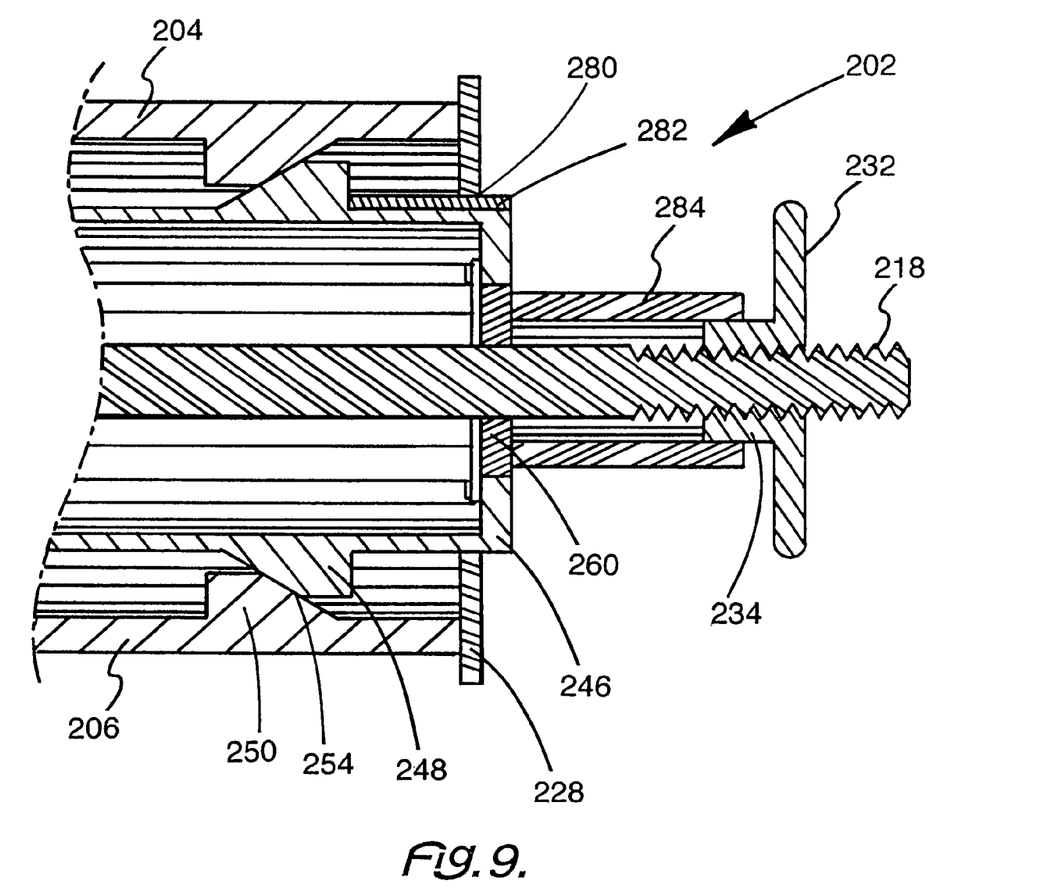
FIG. 9 depicts a cross section view of outboard side 202 showing first bearing 260 of a shimless separator arbor 100.
Figure 10:
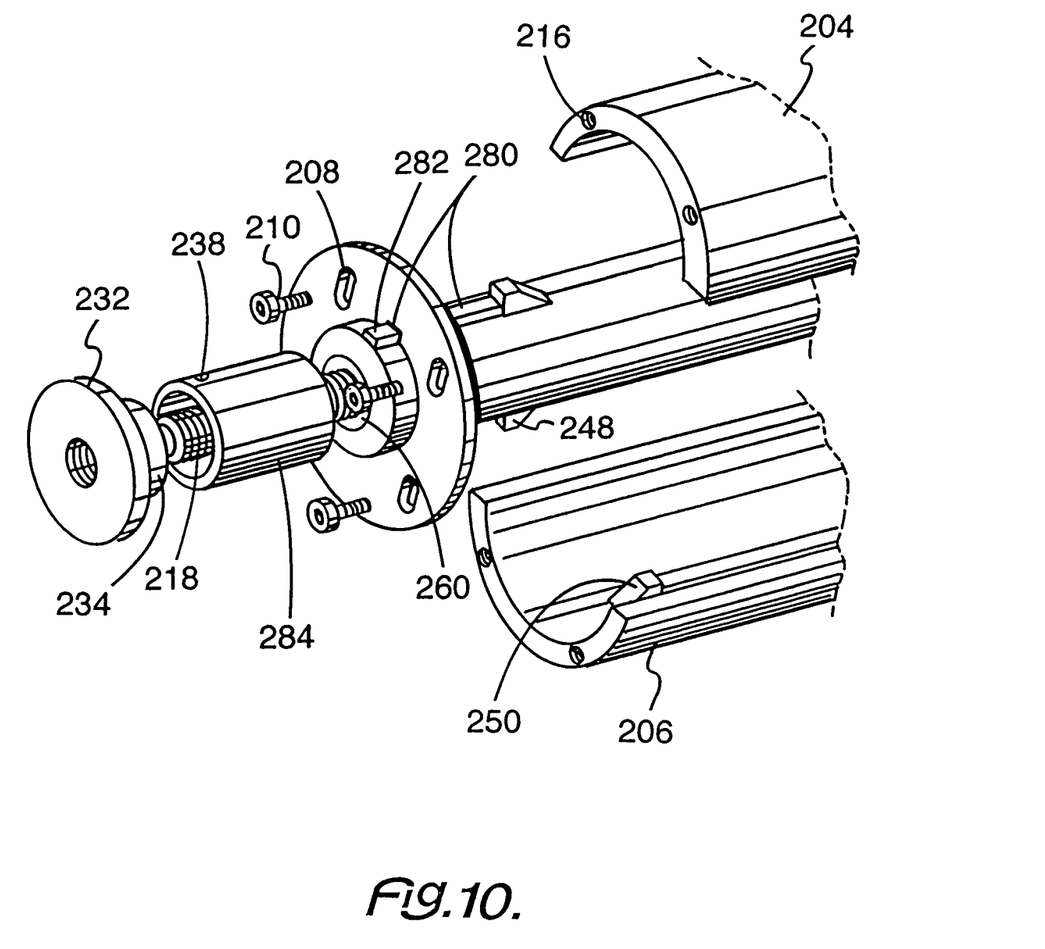
FIG. 10 depicts a perspective view of outboard side 202 showing key 282 in key way 280 of a shimless separator arbor.

With the addition of FIG. 8, FIG. 9 and FIG. 10, outboard side or operator side 202 of shimless separator arbor 100 shows first section 104 with outboard second section 206. Each of the outboard separator lock bolt slots 208 receives an outboard separator lock bolt 210 in the manner described in FIG. 5. Outboard first section 204 and outboard second section 106 are separated from inboard first plate 128 and outboard second plate 228. Shaft 118 extends through locking knob 232 at neck 234. Second bearing 260 supports shaft 118 at key way 280, which in turn receives key 282 to support inner tube 246 in a desired position. Outboard sleeve 284 provides optional support for shaft 118. Safety is thus improved while waste is reduced.

Figure 11:
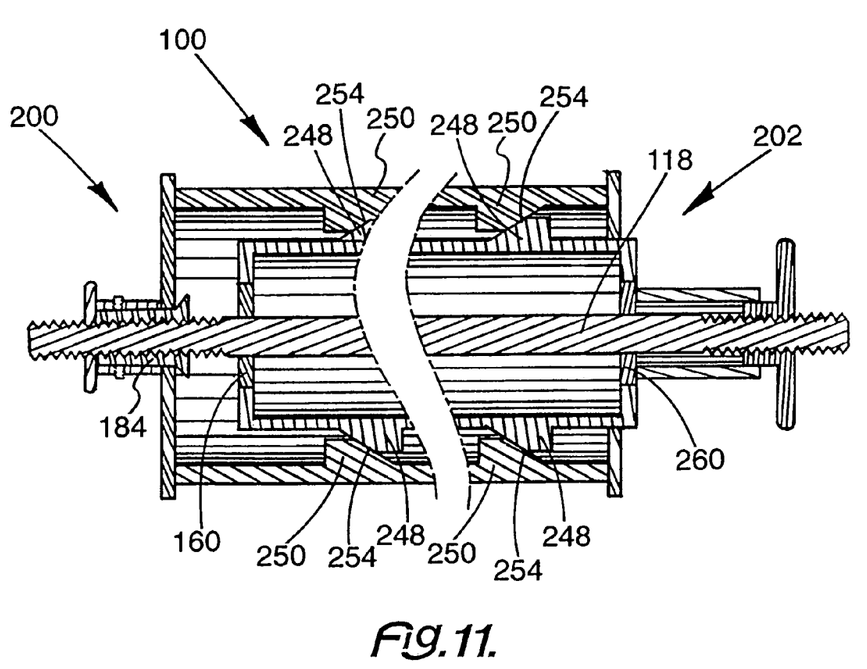
FIG. 11 depicts a cross section view of a shimless separator arbor 100 featuring the relationship of wedges 248 and their action at their contact of each wedge taper 254.

Turning now to FIG. 11, inboard side 200 and outboard side or operator side 202 of shimless separator arbor 100 are shown in functional operation. First bearing 160 supports shaft 118 at an unthreaded portion thereof. Tube wedge 248 cooperates with section wedge 250 and specifically wedge taper 254.

Second bearing 260 is on shaft 118, but oppositely disposed from first bearing 160, to support the opposing end of shaft 118. Key 282 is closer to second bearing 260, than it is first bearing 160.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent is:

1. A shimless separator arbor to assist in cutting a sheet into at least two strips comprising:
   a) a separator adjustment having a first section and a second section, wherein the first section and the second section are separated by an elongated break, and wherein the first section includes a first section wedge, and the second section includes a second section wedge;
   b) a shaft having an unthreaded portion and a threaded portion at two end of the shaft, wherein the first and second sections of the separator adjustment are supported on the shaft;
   c) at least one pair of separator discs and at least one O-ring being between each pair of separator discs, wherein the at least one pair of separator discs and the at least one O-ring are mounted on the separator adjustment, and wherein the at least one O-ring and the at least pair of separator discs supports or separates the at least two strips;
   d) an inner tube including a first and a second tube wedge, and a first and a second bearing provided at two ends of the inner tube;
   wherein an inner surface of the first section and the second section encompasses the inner tube;
   wherein the first section wedge contacts the first tube wedge of the inner tube, and the second section wedge contacting the second tube wedge of the inner tube;
   wherein the first and the second bearing are supported at the unthreaded portion of the shaft; and
   d) a first plate being held on the shaft with a coupler, wherein the coupler includes a stop bushing and a stop set screw, the stop set screw securing and positioning the stop bushing along the shaft.

2. The apparatus of claim 1, further comprising a first wedge taper of the first section wedge contacting with the first tube wedge, and a second wedge taper of the second section wedge contacting with the second tube wedge.

3. The apparatus of claim 2, further comprising a locking knob provided at one of the two ends of the shaft opposite the first plate;
   wherein the second bearing being positioned at a second plate and the locking knob;
   wherein the first plate including at least two inboard lock bolt slots, each of the at least two inboard lock bolt slots receiving a lock bolt to secure the first plate to the first and second sections of the separator adjustment and permitting adjustment of the first and second sections relative to the first plate;
   wherein the second plate including at least two inboard lock bolt slots, each of the at least two inboard lock bolt slots receiving a lock bolt to secure the second plate to the other end of the first and second sections of the separator adjustment and permitting adjustment of the first and second sections relative to the second plate.

4. The apparatus of claim 1, wherein the first plate retains the first section and the second section together in a tubular configuration, wherein the at least one pair of separator discs and the at least one O-ring are mounted on the tube so that the tube extends through the at least one pair of separator discs and the at least one O-ring, and wherein the at least one pair of separator discs and the at least one O-ring are movable on the tube when the first and second sections abut each other and retained in place by friction between the discs and the tube when the first and second sections are moved apart from each other.

5. In a slitter machine for forming a sheet of material into at least two strips of the material, the improvement comprising a shimless separator arbor cooperating with the slitter machine wherein the shimless separator arbor includes:
   a) a separator adjustment having a first section and a second section, wherein the first section and the second section are separated by an elongated break, and wherein the first section includes a first section wedge, and the second section includes a second section wedge;
   b) a shaft having an unthreaded portion and a threaded portion at two end of the shaft, wherein the first and second sections of the separator adjustment are supported on the shaft;
   c) at least one pair of separator discs and at least one O-ring being between each pair of separator discs, wherein the at least one pair of separator discs and the at least one O-ring are mounted on the separator adjustment, and wherein the at least one O-ring and the at least pair of separator discs supports or separates the at least two strips;
   d) an inner tube including a first and a second tube wedge, and a first and a second bearing provided at two ends of the inner tube;
   wherein an inner surface of the first section and the second section encompasses the inner tube;
   wherein the first section wedge contacts the first tube wedge of the inner tube, and the second section wedge contacting the second tube wedge of the inner tube;
   wherein the first and the second bearing are supported at the unthreaded portion of the shaft; and
   d) a first plate being held on the shaft with a coupler, wherein the coupler includes a stop bushing and a stop set screw, the stop set screw securing and positioning the stop bushing along the shaft.

6. The apparatus of claim 5, further comprising a first wedge taper of the first section wedge contacting with the first tube wedge, and a second wedge taper of the second section wedge contacting with the second tube wedge.

7. The apparatus of claim 6, further comprising a locking knob provided at one of the two ends of the shaft opposite the first plate;
   wherein the second bearing being positioned at a second plate and the locking knob;
   wherein the first plate including at least two inboard lock bolt slots, each of the at least two inboard lock bolt slots receiving a lock bolt to secure the first plate to the first and second sections of the separator adjustment and permitting adjustment of the first and second sections relative to the first plate;
   wherein the second plate including at least two inboard lock bolt slots, each of the at least two inboard lock bolt slots receiving a lock bolt to secure the second plate to the other end of the first and second sections of the separator adjustment and permitting adjustment of the first and second sections relative to the second plate.

8. The apparatus of claim 5, wherein the first plate retains the first section and the second section together in a tubular configuration, wherein the at least one pair of separator discs and the at least one O-ring are mounted on the tube so that the tube extends through the at least one pair of separator discs and the at least one O-ring, and wherein the at least one pair of separator discs and the at least one O-ring are movable on the tube when the first and second sections abut each other and retained in place by friction between the discs and the tube when the first and second sections are moved apart from each other.

9. A method of forming a sheet of material into at least two strips of material on a slitter machine comprising:
1) providing a shimless separator arbor comprising:
   a) a separator adjustment having a first section and a second section, wherein the first section and the second section are separated by an elongated break, and wherein the first section includes a first section wedge, and the second section includes a second section wedge;
   b) a shaft having an unthreaded portion and a threaded portion at two end of the shaft, wherein the first and second sections of the separator adjustment are supported on the shaft;
   c) at least one pair of separator discs and at least one O-ring being between each pair of separator discs, wherein the at least one pair of separator discs and the at least one O-ring are mounted on the separator adjustment, and wherein the at least one O-ring and the at least pair of separator discs supports or separates the at least two strips;
   d) an inner tube including a first and a second tube wedge, and a first and a second bearing provided at two ends of the inner tube;
   wherein an inner surface of the first section and the second section encompasses the inner tube;
   wherein the first section wedge contacts the first tube wedge of the inner tube, and the second section wedge contacting the second tube wedge of the inner tube;
   wherein the first and the second bearing are supported at the unthreaded portion of the shaft; and
   d) a first plate being held on the shaft with a coupler, wherein the coupler includes a stop bushing and a stop set screw, the stop set screw securing and positioning the stop bushing along the shaft;
2) providing a drum for the shimless separator arbor;
3) mounting the at least one pair of separator discs and the at least one O-ring on the tube so that the tube extends through the at least one pair of separator discs and the at least one O-ring; and wherein the at least one pair of separator discs and the at least one O-ring are movable on the tube when the first and second sections abut each other and retained in place by friction between the discs and the tube when the first and second sections are moved apart from each other.

* * * * *